J. V. ROBINSON.
AUTOMATIC TRAIN PIPE CONNECTOR.
APPLICATION FILED MAR. 19, 1914. RENEWED OCT. 9, 1916.

1,212,559.

Patented Jan. 16, 1917.

Witnesses
S. L. Tiller
M. C. Sheridan

Inventor
Joseph V. Robinson
By J. A. Watson
Attorney

UNITED STATES PATENT OFFICE.

JOSEPH V. ROBINSON, OF CHEVY CHASE, MARYLAND.

AUTOMATIC TRAIN-PIPE CONNECTOR.

1,212,559.  Specification of Letters Patent.  Patented Jan. 16, 1917.

Application filed March 19, 1914, Serial No. 825,837. Renewed October 9, 1916. Serial No. 124,684.

*To all whom it may concern:*

Be it known that I, JOSEPH V. ROBINSON, a citizen of the United States, and resident of Chevy Chase, county of Montgomery, State of Maryland, have invented certain new and useful Improvements in Automatic Train-Pipe Connectors, of which the following is a specification.

My invention relates to automatic train pipe connectors for automatically connecting air and steam hose between railway cars and has for its object to provide an improved connector head provided with a novel type of guiding prong which will accurately aline the heads under all conditions of disalinement without fouling or jamming and which will firmly hold coupled heads against relative angular movement under the sharp whipping action of moving cars. To attain this end my improved guiding prongs are extended forwardly of the face of the connector head A and substantially at a right angle thereto for a short distance, to constitute a socket in which the sides of an opposing head will firmly seat or socket, locking the connector heads against relative angular movement. In constructing the prongs in this manner, a particular shape for them from the forward extremity of said socket outwardly experience has found to be highly desirable; the preferred form being a prong having a variable curve in the horizontal plane and having a convex guiding face which rises gradually toward the horizontal plane throughout substantially the full length of the prong.

Figure 1:
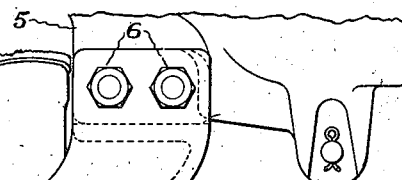
Figures 2, 3:
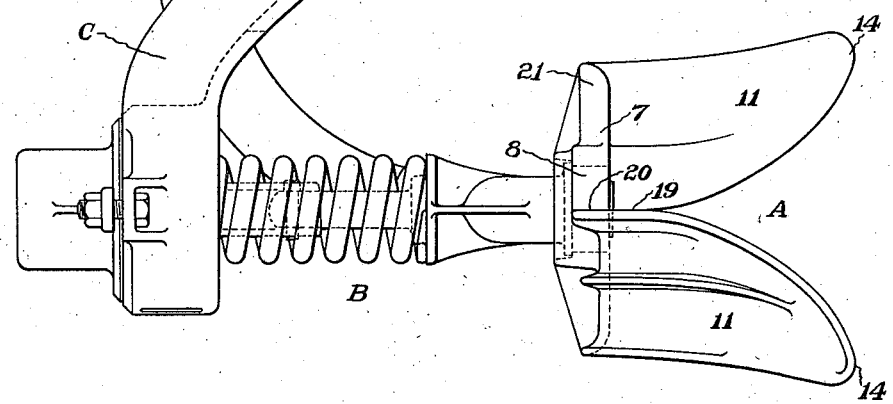
Figure 4:
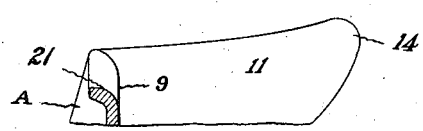

With these objects in view, my invention consists in the combinations, arrangements and constructions hereinafter described, pointed out in the appended claims and illustrated in the accompanying drawings, in which;

Figure 1 is a side elevation of my improved connector head and its support; Fig. 2 is a front face view of the connector head; Fig. 3 is a plan view thereof; and Fig. 4 is a view taken on the line 4—4 of Fig. 2.

Referring to the drawings: My improved connector head is shown at A mounted upon a support B which yieldably supports the head, allowing it to move to the various positions required in service. Any satisfactory form of such support may, of course, be used with the connector head and any suitable form of connection for the support to the car may be employed, such as a lug 5 to which the base C of the support is connected as by bolts 6.

I show the connector head A of general rectangular outline and upon its sides 7 I provide portions 8 which extend rearwardly from the coupling face 9 of the head and substantially at a right angle thereto, to constitute coöperating portions for mating or socketing with the bearing surfaces 10 of the prongs 11 in coupling, whereby mating connector heads are firmly held against relative angular movement. These portions 8 are approximately of the same dimensions as the bearing surfaces or socket walls 10 and lie entirely in the vertical plane. The guiding prongs 11 are diagonally spaced upon said head and serve to aline opposing heads in coupling under all conditions of service. Each of the prongs extends forwardly and outwardly of the head and each is provided with the said bearing surface or socket wall 10 which projects in front of the connector head B and at a right angle to the face thereof, to approximately the point 12 of the prongs. Such surfaces cover only a part of the face of the prongs and like the portions 8 lie entirely in the vertical plane; their purpose being to constitute as aforesaid, a socket in which the sides 7 of an opposing head firmly seat in coupling, effectively preventing relative rocking between the faces of coupled heads and consequently eliminating leaks.

From the coupling face 9 of the head B to approximately the point 12, the prongs are substantially flat, but from said point to substantially the point 13, the prongs curve slowly in the horizontal plane and from the point 13 to the point or extremity 14, they curve rapidly also in the horizontal plane, while the curves 15 and 16 of the outer and inner guiding edges 17 and 18 of the prongs change as they approach the forward extremity 14, from a relatively abrupt curve to a gradual curve encompassing the whole face of the prong, as illustrated particularly in Fig. 2; thus giving to the major portion of the prong a convex formation. Said guiding edges 17 and 18 curve in the true vertical plane where they leave the face of the head A which constitutes the only portion of said prongs that curves in such plane at the face of the head. At 19 the prongs are provided with a lateral shoulder lying entirely in the horizontal plane and extending forwardly of the head A and at a right angle to the face thereof for mating with correspondingly shaped shoulders 20 of the head to prevent relative rocking of coupled heads in the vertical plane, which shoulders extend rearwardly of the head at a right angle to the face thereof, and lie also in the horizontal plane and join with the portions 8 of said head A.

From the point 12 outward, the prongs 11 are slightly spiral shape or twisted to carry the inner guiding edge 18 thereof laterally away from the vertical plane in which lies the surfaces 10 of the prongs sufficiently to prevent jamming of said edge 18 upon the corners 21 of the connector head. These corners are rounded in a direction toward the support B and laterally of the head A, as shown, and this conformation and the spiral formation of the prongs are highly important in insuring proper alinement of mating connector heads under extreme vertical and lateral disalinement. Under such conditions the upper prong of the higher connector head is often carried over the top of the opposing lower head. Then as the cars move together in coupling and the engaging prongs begin to aline the heads, the edge 18 of the prong that has been carried over the top of the lower connector head invariably impinges or sticks upon such head, preventing coupling. By forming the prongs and the connector head A in the manner described, this objection is effectively overcome, as the edge 18 cannot in usual service get far enough over the top of the connector head to impinge on any other surface than that of the rounded corner. With this arrangement accurate alinement of the heads without jamming or sticking is assured under all conditions of service, and as will be apparent, I accomplish this by a simple construction which will hold coupled heads firmly locked against relative angular movement and prevent leaks without the aid of any auxiliary locking devices or guiding prongs.

Having thus described my said invention, what I claim as new and desire to secure by United States Letters Patent is:

1. In an automatic train pipe connector, the combination of a support, and a coupling head carried by said support, said head being provided with diagonally spaced forwardly extending, outwardly diverging spiral shaped guiding prongs.

2. In an automatic train pipe connector, the combination of a support, and a coupling head carried by the support, said head being provided with forwardly extending guiding prongs, each of said prongs being spiral shaped and each being curved gradually to approximately the point 13 and thence abruptly to its forward extremity substantially as described.

3. In an automatic train pipe connector, the combination of a support, a coupling head carried by said support, said head being provided with a coupling face and having at its side a portion extending rearwardly of the head and substantially at a right angle to said face and lying entirely in the vertical plane, said head being rounded from the upper extremity of said portion to approximately the center of the head, and a pair of diagonally spaced forwardly extending guiding prongs for said head, each prong having a bearing surface lying in the vertical plane and extending forwardly of the face of the head and substantially at a right angle thereto for a short distance to constitute a bearing surface for coöperating with said portion at the side of said head in coupling, said prongs having a variable curve in the horizontal plane and having also a convex guiding face which approaches gradually toward the horizontal plane from both edges throughout substantially the full length of the prong.

4. In an automatic train pipe coupling, the combination of a base, a coupling head, a support connected with the base and head and adapted to permit movement of the head in various directions, said head being rectangular in outline and provided with diagonally spaced guiding prongs, each of which is provided with an outer and inner guiding edge and extends forwardly of said head at a right angle thereto for a short distance and thence flares outwardly, said inner guiding edges of the prongs being curved slightly in the vertical plane where they leave the face of said coupling head and constituting the only portion of the prongs which is curved in said plane at the face of said head, the curve of such edges changing as the edges approach the forward extremity of the prong from an abrupt curve to a gradual curve encompassing substantially the whole face of the prong.

5. In an automatic train pipe coupling, the combination of a yieldable support, a rectangular shaped coupling head carried by said support and provided with a coupling face and having at its sides portions lying in the vertical and horizontal planes and extending rearwardly of the head and substantially at a right angle to said face, and diagonally spaced forwardly projecting outwardly extending guiding prongs for said head, each prong having an outer and inner guiding edge and being provided at its base with surfaces lying also in the vertical and horizontal planes and extended forwardly of said coupling face and approximately at a right angle thereto to constitute complementary surfaces for mating with said portions at the sides of the head of a mating coupling, said outer and inner guiding edges of the prongs being curved slightly in the vertical plane where they leave the face of said head and constituting the only portions of the prongs which are curved in said plane at the face of said head, the curve of said edges changing as the edges approach the forward extremity of the prong from an abrupt curve to a gradual curve encompassing substantially the whole face of the prong, whereby accurate vertical and lateral alinement of said complementary surfaces of the prongs with said portions at the sides of the coupling head is assured under all conditions of service in advance of meeting of the faces of mating heads.

6. In an automatic train pipe connector, the combination with a base and a coiled spring connected to and projecting forward from the base, of a head carried at the forward end of the spring, said head having a substantially rectangular face, and wings projecting forward from diagonally opposite upper and lower edges of the head, the upper and lower ends of the face of the head being curved rearwardly, and the corners opposite the wings being rounded as viewed from the front of the coupling, substantially as and for the purpose set forth.

In testimony whereof, I have hereunto set my hand in the presence of two witnesses.

JOSEPH V. ROBINSON.

In the presence of—
S. C. McBride,
Arthur L. Bryant.